United States Patent
Nayak et al.

(10) Patent No.: US 8,825,851 B2
(45) Date of Patent: Sep. 2, 2014

(54) MANAGEMENT OF A VIRTUAL MACHINE IN A STORAGE AREA NETWORK ENVIRONMENT

(75) Inventors: Samdeep Nayak, Sunnyvale, CA (US); Wenhua Liu, Sunnyvale, CA (US); Chiao-Chuan Shih, San Jose, CA (US); Anne Marie Merritt, Sunnyvale, CA (US); Xiangdong G. Huang, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 40 days.

(21) Appl. No.: 13/588,626

(22) Filed: Aug. 17, 2012

(65) Prior Publication Data

US 2014/0052844 A1 Feb. 20, 2014

(51) Int. Cl.
*G06F 15/173* (2006.01)

(52) U.S. Cl.
USPC .......................................................... 709/224

(58) Field of Classification Search
CPC ................... G06F 9/4558; G06F 2009/45575; G06F 9/455; G06F 9/45533; G06F 9/5055; G06F 15/173
USPC .................................. 709/224, 223, 214, 215
See application file for complete search history.

(56) References Cited

U.S. PATENT DOCUMENTS

| 7,519,046 B2 | 4/2009 | Suzuki | |
|---|---|---|---|
| 7,609,650 B2 * | 10/2009 | Roskowski et al. | 370/252 |
| 7,730,486 B2 * | 6/2010 | Herington | 718/1 |
| 8,307,359 B1 * | 11/2012 | Brown et al. | 718/1 |
| 2007/0180087 A1 * | 8/2007 | Mizote et al. | 709/223 |
| 2010/0313256 A1 | 12/2010 | Sekiguchi et al. | |
| 2010/0325273 A1 * | 12/2010 | Kudo | 709/224 |
| 2011/0029970 A1 * | 2/2011 | Arasaratnam | 718/1 |
| 2011/0093740 A1 * | 4/2011 | Tsao | 714/4.12 |
| 2011/0113136 A1 * | 5/2011 | Phaal | 709/224 |
| 2011/0265164 A1 * | 10/2011 | Lucovsky et al. | 726/7 |
| 2012/0239792 A1 * | 9/2012 | Banerjee et al. | 709/223 |
| 2012/0266156 A1 * | 10/2012 | Spivak et al. | 717/172 |
| 2012/0290718 A1 * | 11/2012 | Nethercutt | 709/224 |
| 2013/0254383 A1 * | 9/2013 | Wray | 709/224 |
| 2013/0318228 A1 * | 11/2013 | Raja et al. | 709/224 |

FOREIGN PATENT DOCUMENTS

| JP | 2004145530 A | * | 5/2004 |
|---|---|---|---|
| JP | 2004158009 A | * | 6/2004 |

* cited by examiner

*Primary Examiner* — Kostas Katsikis

(57) ABSTRACT

A computer-implemented method for management of a virtual machine in a storage area network (SAN) environment. A plurality of SAN devices for the virtual machine are discovered by a management server. Performance statistics for the plurality of SAN devices are monitored at the management server. Health of the virtual machine is determined based at least in part on the performance statistics for the plurality of SAN devices at the management server.

23 Claims, 9 Drawing Sheets

400

```
DISCOVER PHYSICALLY ADJACENT SAN DEVICES CONNECTED TO THE SAN
DEVICE AT A SAN DEVICE
410
           ↓
REGISTER THE PHYSICALLY ADJACENT SAN DEVICES CONNECTED TO THE SAN
DEVICE AT A NAME SERVER
420
           ↓
ESTABLISH COMMUNICATIONS BETWEEN A HOST DEVICE AND A TARGET DEVICE OF
THE PLURALITY OF SAN DEVICES, WHEREIN THE VIRTUAL MACHINE IS RESIDENT ON
THE HOST DEVICE
430

ACCESS, AT A HOST DEVICE OF THE PLURALITY OF SAN DEVICES, THE NAME
    SERVER TO DISCOVER A TARGET DEVICE OF THE PLURALITY OF SAN DEVICE
    440
               ↓
    NEGOTIATE, AT THE HOST DEVICE AND THE TARGET DEVICE, PARAMETERS USED
    FOR FURTHER COMMUNICATION BETWEEN THE HOST DEVICE AND THE TARGET
    DEVICE OVER THE SAN
    450
           ↓
IDENTIFY, AT THE HOST DEVICE AND THE TARGET DEVICE A PLURALITY OF PATHS
OVER THE PLURALITY OF SAN DEVICES TO COMMUNICATE BETWEEN THE HOST
DEVICE AND THE TARGET DEVICE
460
           ↓
POPULATE A MAPPING TABLE FOR THE VIRTUAL MACHINE WITH THE PLURALITY OF
PATHS OVER THE PLURALITY OF SAN DEVICES TO COMMUNICATE BETWEEN THE
HOST DEVICE AND THE TARGET DEVICE
470
```

```
QUERY THE PLURALITY OF SAN DEVICES FOR THE PERFORMANCE STATISTICS
510
```

```
RECEIVE THE PERFORMANCE STATISTICS FROM THE PLURALITY OF SAN DEVICES
520

RECEIVE THE PERFORMANCE STATISTICS FROM A HOST DEVICE OF THE
    PLURALITY OF SAN DEVICES
    530

TRACK TAGGED DATA STREAMS OF THE VIRTUAL MACHINE AS THE
        TAGGED DATA STREAMS NAVIGATE THE PLURALITY OF SAN DEVICES
        540

CORRELATE THE TAGGED DATA STREAMS TO THE PERFORMANCE
        STATISTICS FOR DETERMINING HEALTH OF A SAN DEVICE OF THE
        PLURALITY OF SAN DEVICES
        550

RECEIVE THE PERFORMANCE STATISTICS FROM A HOST BUS ADAPTOR OF THE
    PLURALITY OF SAN DEVICES USING A NETWORK LAYER PROTOCOL
    560

RECEIVE THE PERFORMANCE STATISTICS FROM A SWITCH DEVICE OF THE
    PLURALITY OF SAN DEVICES USING A DATA LINK LAYER PROTOCOL
    570

RECEIVE THE PERFORMANCE STATISTICS FROM A TARGET MEMORY ARRAY OF
    THE PLURALITY OF SAN DEVICES USING A SCSI PROTOCOL
    580
```

DETERMINE AN EXPECTED THROUGHPUT RATE THROUGH THE PLURALITY OF SAN NODES FOR EACH VIRTUAL MACHINE OF THE PLURALITY OF VIRTUAL MACHINES
610

---

COMPARE THE EXPECTED THROUGHPUT RATE TO A RECEIVED THROUGHPUT RATE OF THE PERFORMANCE STATISTICS FOR EACH SAN NODE OF THE PLURALITY OF SAN NODES
620

---

DETERMINE HEALTH OF EACH SAN NODE OF THE PLURALITY OF SAN NODES BASED ON THE COMPARING THE EXPECTED THROUGHOUT RATE TO THE RECEIVED THROUGHOUT RATE OF THE PERFORMANCE STATISTICS FOR EACH SAN NODE OF THE PLURALITY OF SAN NODES
630

---

DETERMINE THE HEALTH OF EACH VIRTUAL MACHINE OF PLURALITY OF VIRTUAL MACHINES BASED ON THE HEALTH OF EACH SAN NODE OF THE PLURALITY OF SAN NODES
640

FIG. 6

MANAGEMENT OF A VIRTUAL MACHINE IN A STORAGE AREA NETWORK ENVIRONMENT

CROSS-REFERENCE TO RELATED APPLICATIONS

This application is related to co-pending U.S. patent application Ser. No. 13/588,742 filed on Aug. 17, 2012 entitled "DISCOVERY OF STORAGE AREA NETWORK DEVICES FOR A VIRTUAL MACHINE" by Nayak, et al., and assigned to the assignee of the present application.

BACKGROUND

In current data centers, Storage Area Networks (SANs) are frequently used to provide performance, isolation, reliability and high availability infrastructure required by the enterprise applications. A SAN typically includes various network nodes working in tandem to provide the benefits mentioned above.

In the physical world, an application server is connected to a SAN based target using a host bus adapter (HBA) and a switch. With server virtualization, multiple virtualized application servers generate data and store it to the SAN based target. The mapping of the application server to the underlying SAN node is typically obscured with virtualization.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 4 is a flow diagram of a method for discovering a plurality of SAN devices for a virtual machine, according to various embodiments of the present invention.

FIG. 5 is a flow diagram of a method for monitoring performance statistics for a plurality of SAN devices, according to various embodiments of the present invention.

FIG. 6 is a flow diagram of a method for determining health of a virtual machine based at least in part on the performance statistics for the plurality of SAN devices, according to various embodiments of the present invention.

DESCRIPTION OF EMBODIMENTS

Figure 1:
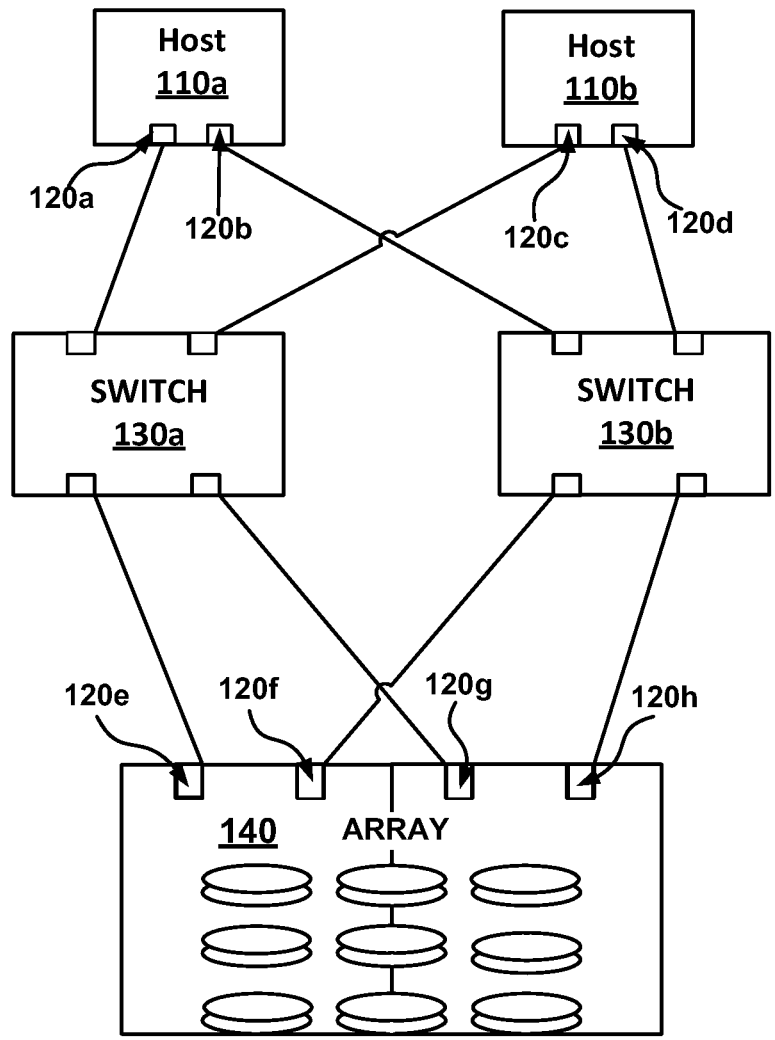
FIG. 1 illustrates an example storage area network (SAN) upon which embodiments of the present invention can be implemented.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "discovering," "monitoring," "determining," "registering," "establishing," "identifying," "populating," "accessing," "negotiating," "querying," "receiving," "tracking," "correlating," "comparing," "displaying," or the like, often refer to the actions and processes of an electronic computing device or system, such as a virtual machine, among others, of a storage area network. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

As previously described in the background, a storage area network (SAN) provides several benefits for enterprise applications. However, end-to-end management of SAN nodes in a heterogeneous environment is a complex task. For instance, each node in SAN has a specific task to perform and theses nodes are typically not configured to share a uniform interface. Moreover, virtualization provides hardware abstraction and allows SAN resources to be dynamically distributed between multiple virtual machines.

In various embodiments described herein, a host/server is connected to a SAN-based target using at least one host bus adapter (HBA) and at least one switch. With server virtualization, multiple host/servers generate data and store it to the SAN-based target. Previously, the mapping of the application server, including any resident virtual machines, to the underlying SAN node was obscured with virtualization. In accordance with various embodiments described herein, a mapping of the virtual machines resident on a host/server is performed by mapping the data flow over the SAN from the virtual machines to the target array. In various embodiments, out of band schemes are enhanced to track the data stream at the granularity of the virtual machines.

Embodiments of the present invention provide for mapping and monitoring the nodes of a SAN in a virtualized environment using an out-of-band scheme to reduce changes to the core protocol and impact to existing infrastructure. Various embodiments described herein may be implemented using VMware vMotion™ and Storage vMotion™ where the virtual machine or the underlying datastore is moved without impacting the application. For instance, embodiments described herein provide for 1) discovering end-to-end SAN nodes of interest and tagging data streams at the virtual machine and virtual volume granularity at the host; 2) defining protocol specific performance thresholds for each of the SAN nodes; and 3) defining an out-of-band scheme to collect the information and predict the health of the application based on the mapping and defined thresholds. The embodiments described herein determine the health of the virtual machine with respect to SAN as good, degraded or failed, and assist in determining proactive remediation actions.

Discussion begins with a description of an example SAN upon which embodiments of the present invention can be implemented. Operation of a SAN implementing virtualization where virtual machines are resident on a host is then described. Operation of the management of a virtual machine in a SAN environment is then described. Operation of various processes of involved in the management of the virtual machine are then described, including examples of discovering SAN devices in the SAN, monitoring performance statistics for the SAN devices, and determining and displaying health of a SAN.

Example Storage Area Network

FIG. 1 illustrates an example SAN 100 upon which embodiments of the present invention can be implemented. SAN 100 may be used, for example, in a datacenter for providing performance, isolation, reliability and high availability infrastructure data storage required by many enterprise applications. SAN 100 comprises various network nodes working in tandem to provide data storage. As illustrated, SAN 100 includes host/servers 110a and 110b (also referred to herein as hosts or servers), host bus adaptors (HBAs) 120a-h, network switches 130a and 130b, and target array 140. It should be appreciated that SAN 100 may include any number of host/servers, HBAs, switches and target arrays, and that the number of components illustrated in FIG. 1 is for illustrative purposes only.

Host/servers 110a and 110b operate as the primary source of data generation in SAN 100. In various embodiments, an operating systems or hypervisor of the host/servers 110a and 110b converts this data to a Small Computer System Interface (SCSI) block format that is understood by the HBA 120a-h interfaces that connect to the SAN 100.

HBAs 120a-h are specialized hardware that accept SCSI requests and convert the requests to an appropriate SAN payload. Accordingly, HBAs 120a-h may be used in both hosts 110a and 110b and in target array 140. In one embodiment, HBAs 120a-d connected to hosts 110a and 110b behave as client/initiators and HBAs 120e-h connected to target array 140 act as a server/target.

Network switches 130a and 130b are operable to connect the various nodes in SAN 100. Network switches 130a and 130b provide the network fabric that operates to interconnect hosts 110a and 110b to target array 140. In one embodiment, network switches 130a and 130b work at the data link layer (e.g., layer 2) of the Open Systems Interconnection (OSI) model.

Target array 140 (also referred to as a storage array) operates as the primary node for storing data. Target array 140 includes multiple disk drives or storage devices, such as solid state disks (SSDs), for storing data. The data transmitted from a host is accepted from an HBA interface 120e-h and the data is stored at target array 140.

Storage Area Network Implementing Virtualization

Figure 2:
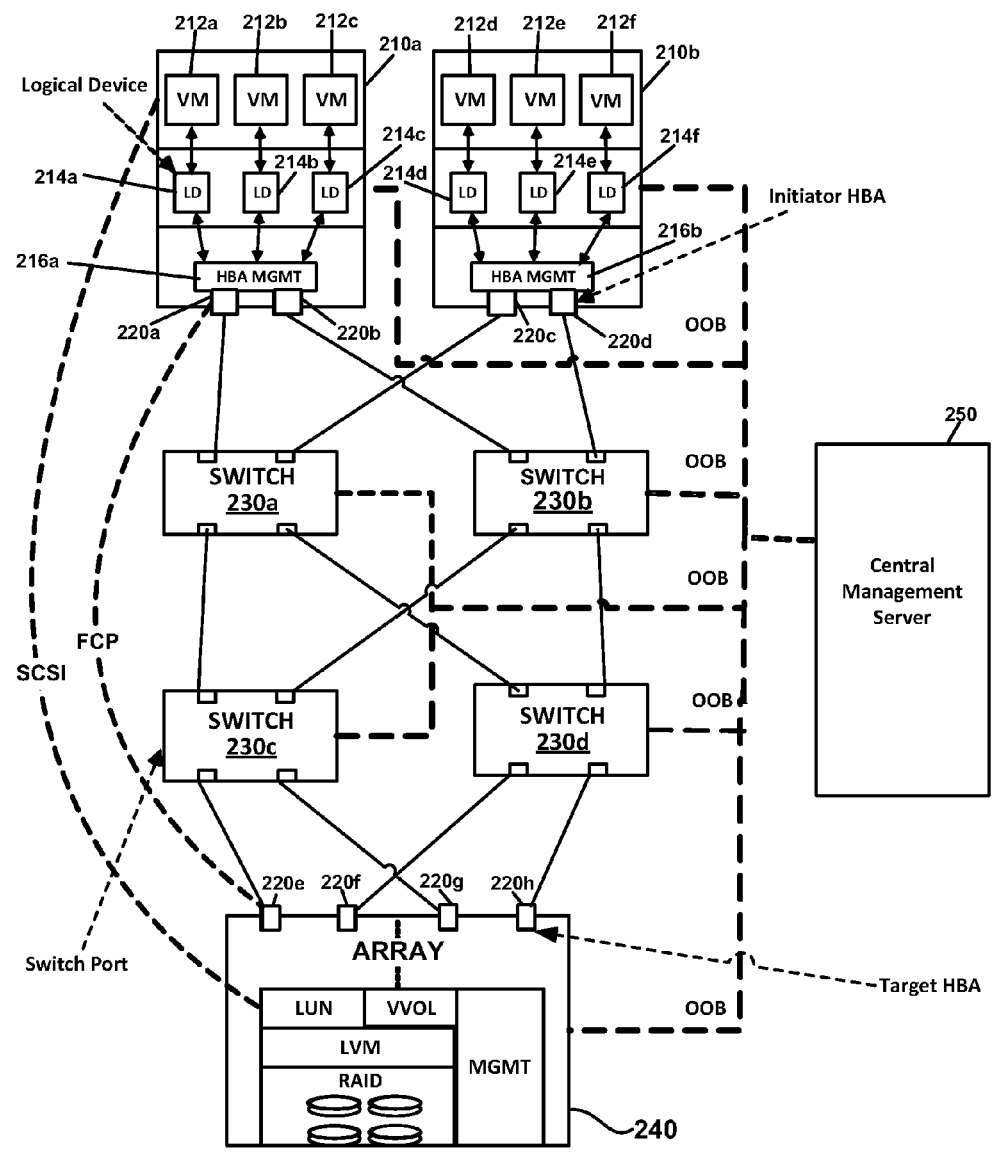
FIG. 2 illustrates a SAN including virtual machines, according to various embodiments of the present invention.

FIG. 2 illustrates a SAN 200 including virtual machines, according to various embodiments of the present invention. SAN 200 may be used, for example, in a datacenter for providing performance, isolation, reliability and high availability infrastructure data storage required by many enterprise applications. SAN 200 provides virtualization using virtual machines 212a-f resident on hosts 210a and 210b, as illustrated. SAN 200 includes various network nodes working in tandem to provide data storage. As illustrated, SAN 200 includes hosts 210a and 210b, HBAs 220a-h, network switches 230a-d, target array 240, and central management server 250. It should be appreciated that SAN 200 may include any number of hosts, HBAs, switches, target arrays and management servers, and that the number of components illustrated in FIG. 2 is for illustrative purposes only.

As described herein in accordance with the various embodiments, end-to-end health of a virtual machine is determined based on the flow of the input/output (I/O) rate of data through various nodes of the SAN. For example, the data moves through host 210a, HBA 220a, switch 230a, and switch 230d, to target array 240. Each node (e.g., device) of the SAN has a unique role to play and provides distinct health criteria relative to that role. In one embodiment, the overall health is determined based on the I/O rate while considering overall load of the system. In addition, any associated error on a particular node may also assist in determining the health condition of the SAN.

Hosts 210a and 210b operate as the primary source of data generation in SAN 200. In various embodiments, an operating system or hypervisor of the hosts 210a and 210b convert this data to a SCSI block format that is understood by the HBA 220a-h interfaces that connect to the SAN 200 in a manner similar to that described in accordance with SAN 100 of FIG. 1. Hosts 210a and 210b also include a plurality of virtual machines (e.g., virtual machines 212a-f), each of which is communicatively coupled to HBAs 220a-d over a logical device (e.g., logical devices 214a-f). In one embodiment, a host includes one or more HBA management interfaces 216a and 216b that serves to communicatively couple the logical devices to the HBAs. It should be appreciated that a host may include any number of virtual machines, logical devices, HBA management interfaces, and HBAs, and that the number of components illustrated in FIG. 2 is for illustrative purposes only.

In one embodiment, a hypervisor on the host emulates virtual disks for a given virtual machine and the data is transmitted to the HBAs at the SCSI layer. Since a host 210a and 210b can host multiple virtual machines, the health of a virtual machine is relative to other virtual machines and their disks in the system. In one embodiment, the health of the underlying software is determined by the rate of I/O completion for the virtual disk considering the load conditions that contest for the same resources. The differentiation for each of the virtual machines on the same host may be caused by software and hardware resources consumed by the virtual disk of a virtual machine, e.g., various HBA adapters offer different types of offload capabilities. For instance, when the data is traversing through a multi-queue capable adapter, the I/O completions are spread across the cores so as to not cause cache pollution. This might result in lower processor usage and latency for the data transmission. Similarly marked differences might also be seen when the data traverses through the software adapters that use commodity hardware (e.g., network interface cards) for transferring SCSI data (e.g., Internet SCSI (iSCSI) and Fibre Channel over Ethernet (FCoE)).

However, in a virtualization environment, when data traverses the SAN certain identifiers may be lost. For instance, in a VMware virtualization system, the virtual machine and virtual machine disk (VMDK) identifiers are lost when the data traverses down to the storage array. As such, this makes it hard to budget the I/O to the appropriate SAN resources. As described herein in the various embodiments, changes are made to the storage array of the virtual infrastructure to preserve virtual machine and VMDK information in the SCSI command.

HBAs 220a-h are specialized hardware that accept SCSI requests and convert the requests to an appropriate SAN payload. Accordingly, HBAs 220a-h may be used in both hosts 210a and 210b and in target array 240. In one embodiment, HBAs 220a-d connected to hosts 210a and 210b behave as a client/initiator and HBAs 220e-h connected to target array 240 act as a server/target.

In various embodiments, an HBA transmits data in accordance with the Fibre Channel Protocol (FCP) or iSCSI (L3) level. At this level, each SCSI I/O that is offered to the HBA may be further split into a large number of exchanges, e.g., protocol data units (PDUs) in iSCSI. The I/O rate of FCP/iSCSI is indicative of the overall health of end points between the host and the target. A drop in the I/O rate may indicate issues in the SAN between the host and target. At this level in the SAN, the virtual machine granularity is obscured and health of the node is determined based on the defined criteria for the SAN. In various embodiments, a SCSI command is transmitted over Fibre Channel (FC), Ethernet, InfiniBand, or Serial Attached SCSI (SAS) transport fabrics. In various embodiments, these fabrics provide a four layer network model, namely, link layer, internet layer, transport layer, and application layer. The link layer is responsible for delivering data over a particular physical media. As illustrated in FIG. 2, the data transmitted from HBA 220a to HBA 220e forms link layer traffic. In various embodiments, the fabric switches are operable at the link layer. The internet layer is responsible for delivering data across different types of physical networks, e.g., if data is to be routed out to a remote location, a router can be configured between two switches, such as switches 230a and 230c. The internet layer helps in resolving the routing address and forwards the frames appropriately. The transport layer is responsible for data flow management. For example, data entering firmware of HBA 220a and exiting firmware of HBA 220e to target array 240 are transmitted over the transport layer. In various embodiments, the SCSI command is embedded as part of the application layer in the host software of HBAs 220a and 220e, e.g., FCP for FC/FCoE, iSCSI for Ethernet, SCSI Remote Protocol (SRP) for InfiniBand, or Serial SCSI Protocol (SSP) for SAS.

Network switches 230a-d are operable to connect the various nodes in SAN 200. Network switches 230a-d provide the network fabric that operates to interconnect hosts 210a and 210b to target array 240. In one embodiment, network switches 130a and 130b work at the data link layer (e.g., layer 2) of the OSI model. Data I/O statistics are collected by central management server 250 using an out-of-band (OOB) scheme. For instance, a drop in the L2 I/O rate or error rate may indicate issues in the fabric between two ports.

Target array 240 (also referred to as a storage array) operates as the primary node for storing data. Target array 240 includes multiple disk drives or storage devices for storing data. The data transmitted from a host is accepted from an HBA 220e-h and the data is stored at target array 240.

In one embodiment, I/O statistics at the target array 240 are collected using an OOB scheme at the virtual machine volume or logical unit number (LUN) granularity. In one embodiment, target array 240 provides several statistics of importance. For example, target array 240 might provide application layer statistics and SCSI I/O statistics to hosts 210a and 210b and SCSI I/O statistics to the internal storage devices. The statistics can be provided at the per physical logical unit number (LUN) storage device, per virtual volume or logical volume management (LVM), or based on application protocol (e.g., FCP/iSCSI). The physical port statistics on target array 240 are also retrieved through the OOB scheme.

In various embodiments described herein, central management server 250 is operable to perform a method for management of a virtual machine in a SAN environment. As described below, central management server 250 is operable to maintain a mapping of devices of the SAN 200 to the particular virtual machines, and is configured to query the SAN devices of the SAN for their respective performance statistics. As described herein, in various embodiments, the performance statistics are received using an OOB scheme. Central management server 250 is also configured to determine the health of devices of the SAN and the health of the virtual machines based on the health of the devices, and is configured to provide the health information in a display. It should be appreciated the central management server 250 is also configured to execute virtualization suites, such as VMware's vCenter™.

Example Methods of Operation

The following discussion sets forth in detail the operation of some example methods of operation of embodiments. With reference to FIGS. 3-7, flow diagrams 300, 400, 500, 600 and 700 illustrate example procedures used by various embodiments. Flow diagrams 300, 400, 500, 600 and 700 include some procedures that, in various embodiments, are carried out by a processor under the control of computer-readable and computer-executable instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, SSDs, and optical disks, any or all of which may be employed with the devices of SAN 200. The computer-readable and computer-executable instructions, which reside on tangible computer readable storage media, are used to control or operate in conjunction with, for example, one or some combination of processors of distributed SAN 200. It is appreciated that the processor(s) may be physical or virtual or some combination (it should also be appreciated that a virtual processor is implemented on physical hardware). Although specific procedures are disclosed in flow diagrams 300, 400, 500, 600 and 700, such procedures are examples. That is, embodiments are well suited to performing various other procedures or variations of the procedures recited in flow diagrams 300, 400, 500, 600 and 700, alone or in combination. Likewise, in some embodiments, the procedures in flow diagrams 300, 400, 500, 600 and 700, alone or in combination, may be performed in an order different than presented and/or not all of the procedures described in one or more of these flow diagrams may be performed. It is further appreciated that procedures described in flow diagrams 300, 400, 500, 600 and 700, alone or in combination, may be implemented in hardware, or a combination of hardware with firmware and/or software.

Figure 3:
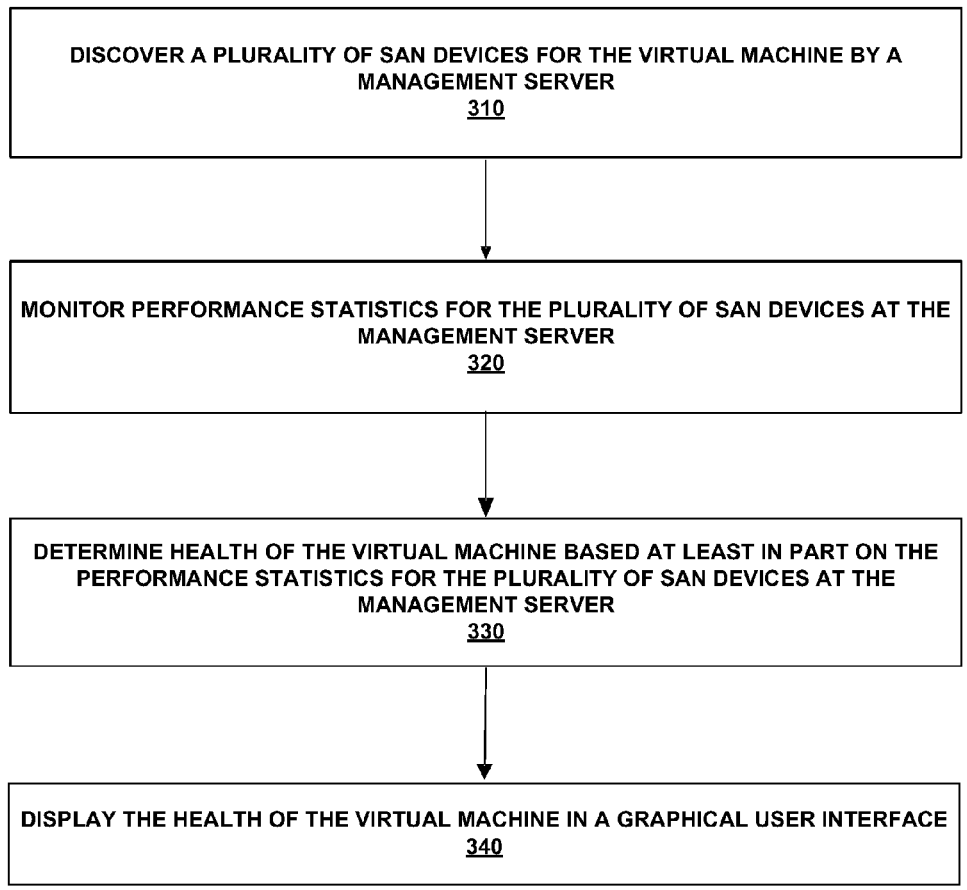
FIG. 3 is a flow diagram of a method for management of a virtual machine in a SAN environment, according to various embodiments of the present invention.

FIG. 3 is a flow diagram 300 of a method for management of a virtual machine in a SAN environment, according to various embodiments of the present invention. Although specific procedures are disclosed in flow diagram 300, embodiments are well suited to performing various other procedures or variations of the procedures recited in flow diagram 300. It is appreciated that the procedures in flow diagram 300 may be performed in an order different than presented, that not all of the procedures in flow diagram 300 may be performed, and that additional procedures to those illustrated and described may be performed. All of, or a portion of, the procedures described by flow diagram 300 can be implemented by a processor or computer system executing instructions which reside, for example, on computer-usable/readable media. The computer-usable media can be any kind of non-transitory storage that instructions can be stored on. Non-limiting examples of the computer-usable/readable media include but are not limited to a diskette, a compact disk (CD), a digital versatile device (DVD), read only memory (ROM), flash memory, SSDs, and so on.

At procedure 310 of flow diagram 300, a plurality of SAN devices for a virtual machine are discovered by a central management server. Example procedures for the discovery of the SAN device for a virtual machine are described below in accordance with flow diagram 400 of FIG. 4.

At procedure 320 of flow diagram 300, performance statistics for the plurality of SAN devices are monitored at the central management server. In one embodiment, the performance statistics include I/O statistics from the plurality of SAN devices for data streams of the virtual machine. In one embodiment, the I/O statistics includes I/O rate information and I/O error information for each of the plurality of SAN devices. Example procedures for monitoring the performance statistics for the plurality of SAN devices are described below in accordance with flow diagram 500 of FIG. 5.

At procedure 330 of flow diagram 300, health of the virtual machine is determined based at least in part on the performance statistics for the plurality of SAN devices at the central management server. Example procedures for determining the health of the virtual machine are described below in accordance with flow diagram 600 of FIG. 6.

At procedure 340 of flow diagram 300, the health of the virtual machine is displayed in a graphical user interface. Example procedures for displaying the health of the virtual machine are described below in accordance with flow diagram 700 of FIG. 7.

FIG. 4 shows a flow diagram 400 of a method for discovering a plurality of SAN devices for a virtual machine according to various embodiments of the present invention.

At procedure 410 of flow diagram 400, at a SAN device of the SAN, physically adjacent SAN devices connected to the SAN device are discovered. For instance, two physically adjacent ports of SAN devices that are connected to each other through a physical wire discover each other. In one embodiment, each of the nodes is identified by a World Wide ID (WWID). As part of the fabric discovery, nodes negotiate the parameters for use in further operations. In one embodiment, a separate fabric identifier may be allocated to the host at the end of negotiation. For example, when the SAN is powered on, HBA 220b performs a login to the switch port of switch 230b that it is attached to.

At procedure 420 of flow diagram 400, at a SAN device of the SAN, the physically adjacent SAN devices connected to the SAN device are registered at a name server. According to the various embodiments described herein, a name server is a data repository (e.g., a database) that includes the attributes of hosts and targets of a SAN. Each SAN device can register its own attributes and can query information about other devices by accessing the name server. In one embodiment, the name server is maintained in a central management server (e.g., central management server 250 of FIG. 2). The name server service helps the hosts locate the targets of the SAN. In one embodiment, whenever there are changes to the configuration of the SAN, the name server alerts the registered nodes of the change involved. For example, Fibre Channel (FC) name servers typically run in the switch. Moreover, in the case of iSCSI, dedicated hosts typically run a name service. Configuration changes in FC name servers are indicated by registered state change notifications (RSCN).

At procedure 430 of flow diagram 400, communications between a host device and a target device of the plurality of SAN devices is established. In one embodiment, at least one virtual machine is resident on the host device.

In one embodiment, as shown at procedure 440 of flow diagram 400, communication between the target and host is established by the host device first accessing the name server to discover a target device of the plurality of SAN devices. For example, based on the target attributes discovered, a host can login to the target and its services. In one embodiment, as shown at procedure 450 of flow diagram 400, once the host device has discovered the target device, the host device and the target device negotiate parameters used for further communication between the host device and the target device over the SAN. For example, in FC, a host can initiate a port login (PLOGI) to login to the target and subscribe to the services offered by the target. It should be appreciated that while this is staged in two phases for FC, the same is accomplished in FC in a single step.

At procedure 460 of flow diagram 400, the host device and the target device identify a plurality of paths over the plurality of SAN devices to communicate between the host device and the target device. In one embodiment, as part of SCSI discovery, the initiator sends series of SCSI commands to report devices attached to the target and identifies the attributes of that device using SCSI Inquiry commands. For example, in vSphere each of the discovered devices is called a Path. To support redundancy, there are multiple connections between the host and the target. Hence it is possible to locate the same device using different combinations of HBAs, switches and target ports. In one embodiment, the multiple paths are exported as a logical device to the Logical Volume Manager (LVM) of the target array. It should be appreciated that while there can be multiple paths to the same logical device, not all the paths have to be active at the same time. Based on the target behavior, the logical device is made available to host either as Active-Active, Active-Passive, Active-Unoptimized. For example, SCSI uses the REPORT LUNS command to list the devices attached to a target and try to identify the type of device (e.g., disk drive, tape drive, etc.) by sending an inquiry command to the device. In another example, in case of vSphere, the logical devices that are discovered as part of SCSI discovery are made available to virtual machines to store data as a data store.

At procedure 470 of flow diagram 400, populating a mapping table for the virtual machine with the plurality of paths over the plurality of SAN devices to communicate between the host device and the target device is populated. For instance, when a virtual machine is created, an administrator is able to select the host and the target to be used for this placement. It should be appreciated that the host and the target are not static entries and can change (e.g., based on VMware vMotion™ and Storage vMotion™ activities). Based on the host and target information available for the initial placement, the mapping table is populated. In one embodiment, the mapping table includes a WWID for each SAN device supporting communication between the host device and the target device of the virtual machine.

In one embodiment, the mapping table is populated as follows. Since a virtual machine can have multiple virtual devices on different targets, the following description is repeated for each virtual device. For a given host on which a virtual machine is placed initially, the WWID information of the SAN and the Fabric Identifiers are queried by the kernel module of the host. Based on the datastore details (e.g., of the logical device), all the paths associated are identified. Based on the multi pathing configuration, the path that is used for data transfers is further narrowed down. For this given path, the target WWID that was used for login is queried. Upon successful query, the WWID and Fabric Identifier of host and target WWID are registered. Using the host WWID and Fabric Identifier and target WWID, the path details in the fabric are queried using Common Information Model (CIM) Storage Management Initiation-Specification (SMI-S) profile. It should be appreciated that the information that is made available is updated in the central management server. In one embodiment, this is repeated when the virtual machine or storage is moved with VMotion or Storage VMotion.

FIG. 5 shows a flow diagram 500 of a method for monitoring performance statistics for a plurality of SAN devices according to various embodiments of the present invention.

At procedure 510 of flow diagram 500, the plurality of SAN devices are queried for their performance statistics. In one embodiment, central management server 250 of FIG. 2 queries the SAN devices of the SAN for their performance statistics. As described above, the end-to-end health of a virtual machine is determined based on the flow of the input/output (I/O) rate of data through various nodes of the SAN. For example, the data moves through nodes of the SAN, wherein each node (e.g., device) has a particular role to play and provides distinct health criteria relative to that role.

At procedure 520 of flow diagram 500, the performance statistics are received from the plurality of SAN devices. In one embodiment, the performance statistics are received at the central management server 250. In one embodiment, the performance statistics include I/O statistics from the plurality of SAN devices for data streams of the virtual machine. In one embodiment, the I/O statistics includes I/O rate information and I/O error information for each of the plurality of SAN devices. In one embodiment, the performance statistics are received using an OOB scheme.

At procedure 530 of flow diagram 500, the performance statistics from a host device of the plurality of SAN devices are received. In one embodiment, as shown at procedure 540, tagged data streams of the virtual machine are tracked as the tagged data streams navigate the plurality of SAN devices. In one embodiment, a tag identifies a tagged data stream as associated with a particular virtual machine, wherein data streams of the virtual machine are tagged at a host server of the SAN environment. In one embodiment, the tag is added to the data stream using a SCSI command. For example, for each virtual device, the following statistics are received:

```
class VscsiStats
{
    //IO Statistics
    uint64 statsTime; /* The time since stats cleared (in milliseconds) */
    uint64 statsTime; /* * The time since stats cleared (in milliseconds) */
    uint64 numReads; /* * Number of read commands completed. */
    uint64 numWrites; /* Number of write commands completed. */
    uint64 bytesRead; /* Data transferred of read commands (in bytes) */
    uint64 bytesWrite; /* Data transferred of write commands (in bytes) */
    uint64 latencyReads; /* Latency of read commands (in milliseconds) */
    uint64 latencyWrites; /* Latency of write commands (in milliseconds) */
    //IO Errors
```

-continued

```
    uint64 ioErrors; /* Number of IO failures with sense data */
    uint64 busyErrors; /* Number of IOs returned busy for transient errors */
};
```

At procedure 550 of flow diagram 500, the tagged data streams are correlated to the performance statistics for determining health of a SAN device of the plurality of SAN devices. In one embodiment, the correlating the tagged data streams to the performance statistics is for identifying I/O rate information and I/O error information of the tagged data streams.

At procedure 560 of flow diagram 500, the performance statistics from an HBA (e.g., HBA 220a of FIG. 2) of the plurality of SAN devices are received using a network layer protocol. For example, for FCoE, the following protocol statistics are received:

```
class FCoEStats
{
// IO Statistics
    uint64 Tx_Frames;
    uint64 Rx_Frames;
    uint64 Control_Frames;
// Error Statistics
    uint64 Error Frames;
    uint64 Dumped Frames;
    uint64 Link Failure Count;
    uint64 Loss of Signal Count;
    uint64 Invalid Tx Word Count;
    uint64 Invalid CRC Count;
    uint64 VLink Failure Count;
    uint64 Miss Disc Adv Count;
}
```

At procedure 570 of flow diagram 500, the performance statistics from a switch device (e.g., switch 230a of FIG. 2) of the plurality of SAN devices are received using a data link layer protocol. For example, for CIM SIM-S, the following protocol statistics are received:

```
class CIM_FCPortRateStatistics : CIM_StatisticalData { uint64
TxFrameRate;
    uint64 RxFrameRate;
    uint64 MaxTxFrameRate;
    uint64 MaxRxFrameRate;
    uint64 TxRate;
    uint64 RxRate;
    uint64 PeakTxRate;
    uint64 PeakRxRate;
};
class CIM_FCPortStatistics : CIM_NetworkPortStatistics {
    uint64 LIPCount;
    uint64 NOSCount;
    uint64 ErrorFrames;
    uint64 DumpedFrames;
    uint64 LinkFailures;
    uint64 LossOfSignalCounter;
    uint64 LossOfSyncCounter;
    uint64 PrimitiveSeqProtocolErrCount;
    uint64 CRCErrors;
    uint64 InvalidTransmissionWords;
    uint64 FramesTooShort;
    uint64 FramesTooLong;
    uint64 AddressErrors;
    uint64 BufferCreditNotProvided;
    uint64 BufferCreditNotReceived;
    uint64 DelimiterErrors;
    uint64 Encoding DisparityErrors;
    uint64 LinkResetsReceived;
    uint64 LinkResetsTransmitted;
```

```
    uint64 MulticastFramesReceived;
    uint64 MulticastFramesTransmitted;
    uint64 FBSYFrames;
    uint64 PBSYFrames;
    uint64 FRJTFrames;
    uint64 PRJTFrames;
    uint64 RXClass1Frames;
    uint64 TXClass1Frames;
    uint64 Class1FBSY;
    uint64 Class1PBSY;
    uint64 Class1FRJT;
    uint64 Class1PRJT;
    uint64 RXClass2Frames;
    uint64 TXClass2Frames;
    uint64 Class2FBSY;
    uint64 Class2PBSY;
    uint64 Class2FRJT;
    uint64 Class2PRJT;
    uint64 RXClass3Frames;
    uint64 TXClass3Frames;
    uint64 Class3FramesDiscarded;
    uint64 RXBroadcastFrames;
    uint64 TXBroadcastFrames;
};
```

At procedure 580 of flow diagram 500, the performance statistics from a target memory array of the plurality of SAN devices are received using a SCSI protocol. For example, using an OOB scheme, the following protocol statistics are received:

```
    class ArrayStats
    {
    Uint64 TotalIOs;
    Uint64 KBytesTransfered;
    Uint64 IOTimeCounter;
    Uint64 ReadIOs ReadHitIOs;
    Uint64 ReadIOTimeCounter;
    Uint64 ReadHitIOTimeCounter;
    Uint64 KBytesRead;
    Uint64 WriteIOs;
    Uint64 WriteHitIOs;
    Uint64 WriteIOTimeCounter;
    Uint64 WriteHitIOTimeCounter; and
    Uint64 KBytesWritten OtherIOs.
    }
```

FIG. 6 shows a flow diagram 600 of a method for determining the health of a virtual machine based at least in part on the performance statistics for the plurality of SAN devices according to various embodiments of the present invention. In various embodiments, the health of the virtual machine is determined based on active and passive monitoring of the nodes involved. In active monitoring, the central management server monitors the performance statistics of all the nodes and makes active decisions of node performance. For passive monitoring, the error statuses of the SAN nodes involved are monitored and the status is updated accordingly.

At procedure 610 of flow diagram 600, an expected throughput rate (e.g., I/O rate) through the plurality of SAN nodes for each virtual machine of the plurality of virtual machines is determined.

At procedure 620 of flow diagram 600, the expected throughput rate is compared to a received throughput rate of the performance statistics for each SAN node of the plurality of SAN nodes.

At procedure 630 of flow diagram 600, the health of each SAN node of the plurality of SAN nodes is determined based on the comparison of the expected throughput rate to the received throughput rate of the performance statistics for each SAN node of the plurality of SAN nodes.

For instance, in active monitoring of the health of the virtual machine, the central management server (e.g., a vCenter Operations adapter) collects the physical limits for the paths associated and predetermines the expected I/O rate for a given virtual machine through all the nodes. These paths are then monitored through periodic polling. When the throughput drops below an optimal threshold (e.g., 90%), the central management server considers surrounding factors to determine if the throughput drop is caused due to overall load in the system. If the peer nodes are equally stressed, no change in health is recorded. However if the throughput drops down to degrade threshold (e.g., 50%) across all nodes, the node in question is marked to be in degraded state. If the throughput drops down to failed threshold (e.g., 0%), the node will be marked as failed. Similarly, when the throughput is recovered, the central management server will adjust virtual machine status accordingly.

In another example, in passive monitoring of the health of the virtual machine, the health of the node is immediately updated based on a detected error or error pattern received at the central management server from the SAN device. For example, a down link on a port marks the state as failed for the node. An error pattern exists where questionable operations occur over a period of time, e.g., when protocol errors are seen over a period of time, a possible degraded system is indicated.

In one embodiment, as shown at procedure 640 of flow diagram 600, the health of each virtual machine of the plurality of virtual machines is determined based on the health of each SAN node of the plurality of SAN nodes. For example, the health of the virtual machine is 1) marked degraded when any of the nodes in question are in degraded mode; 2) marked degraded when some of the nodes are failed but there are alternate paths available; or 3) marked failed when all nodes in question are failed. It should be appreciated that virtual machine health status will be changed upon system recovery.

Figure 7A:
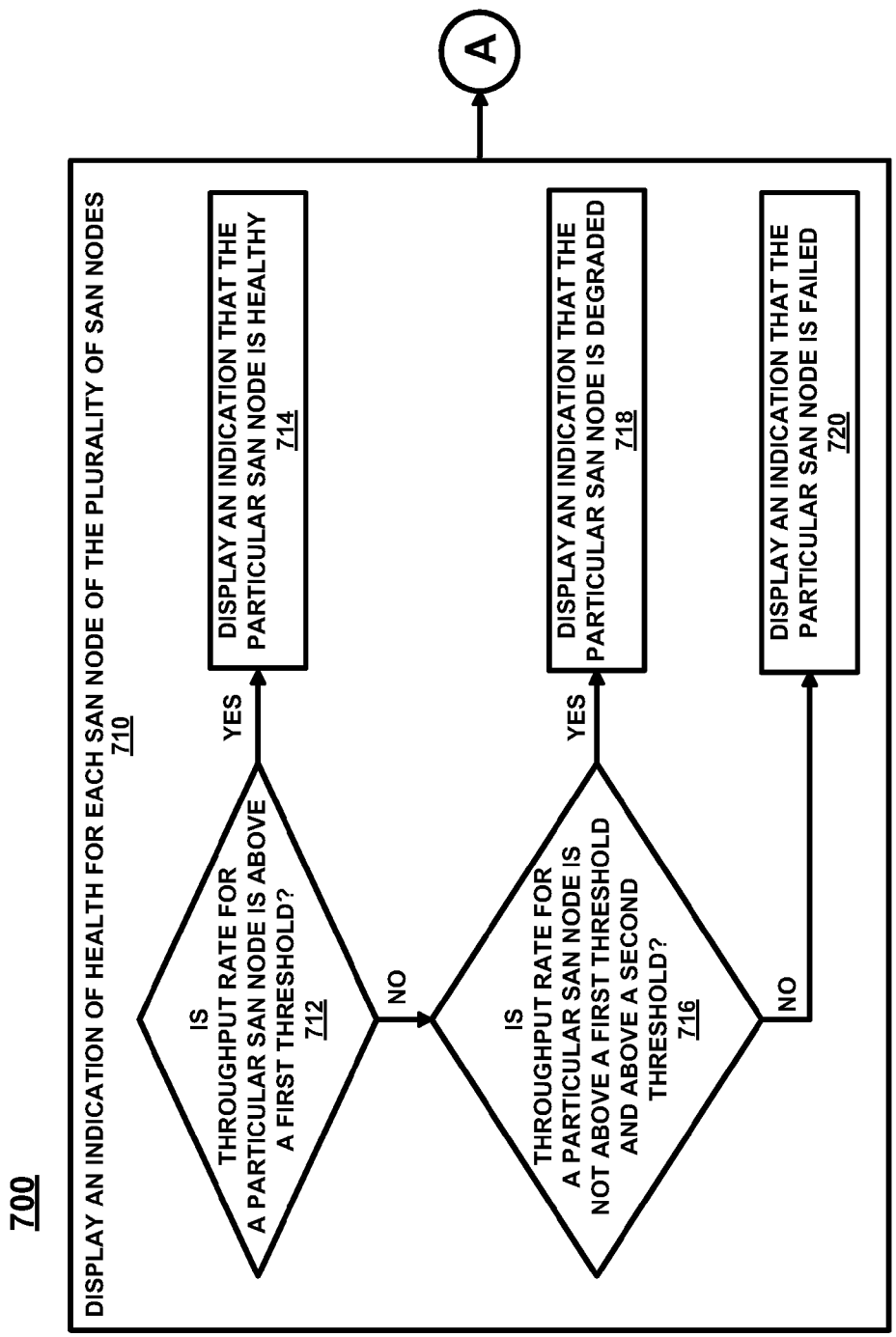
FIGS. 7A and 7B are a flow diagram of a method for displaying the health of a virtual machine, according to various embodiments of the present invention.
Figure 7B:
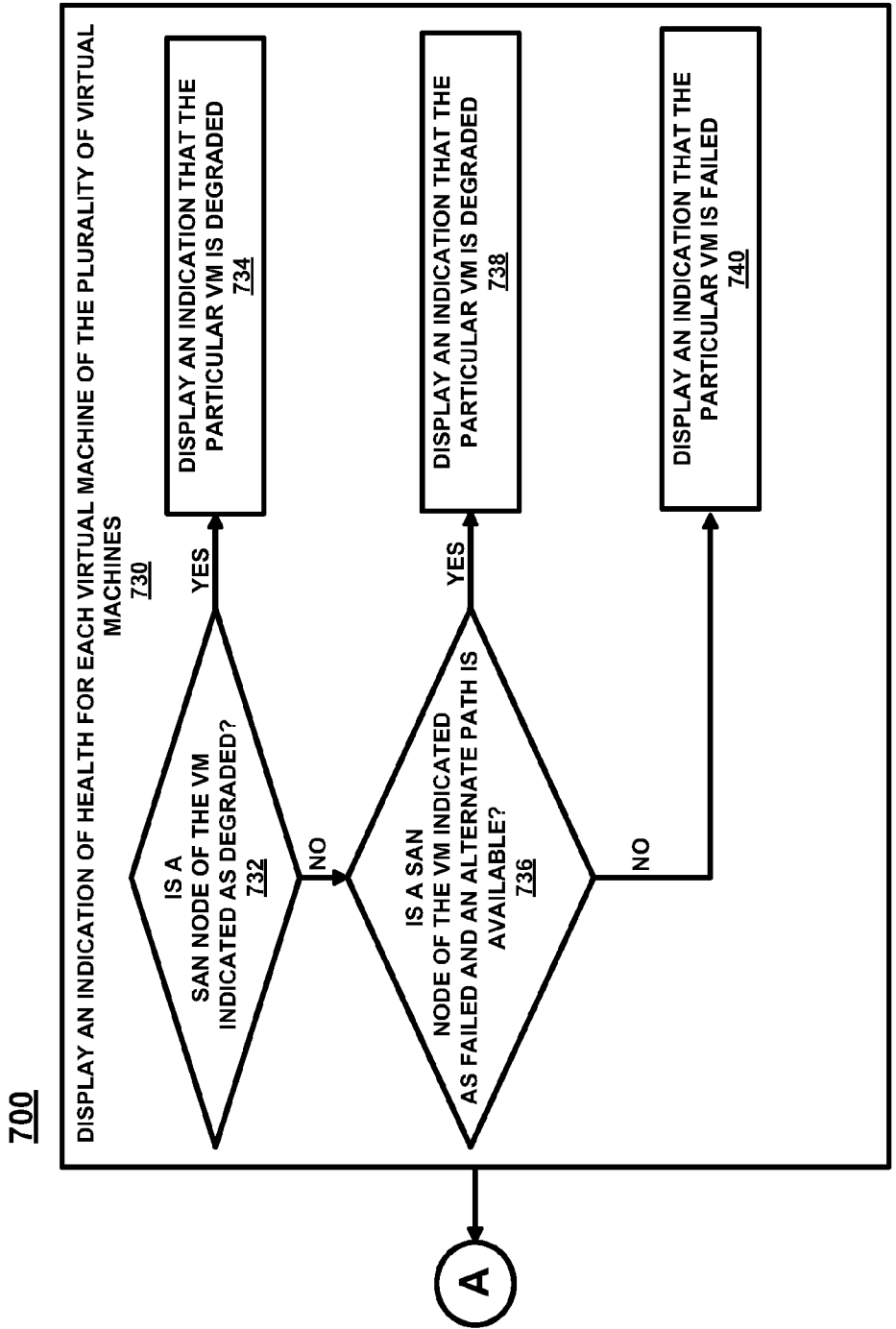
Figure 8:
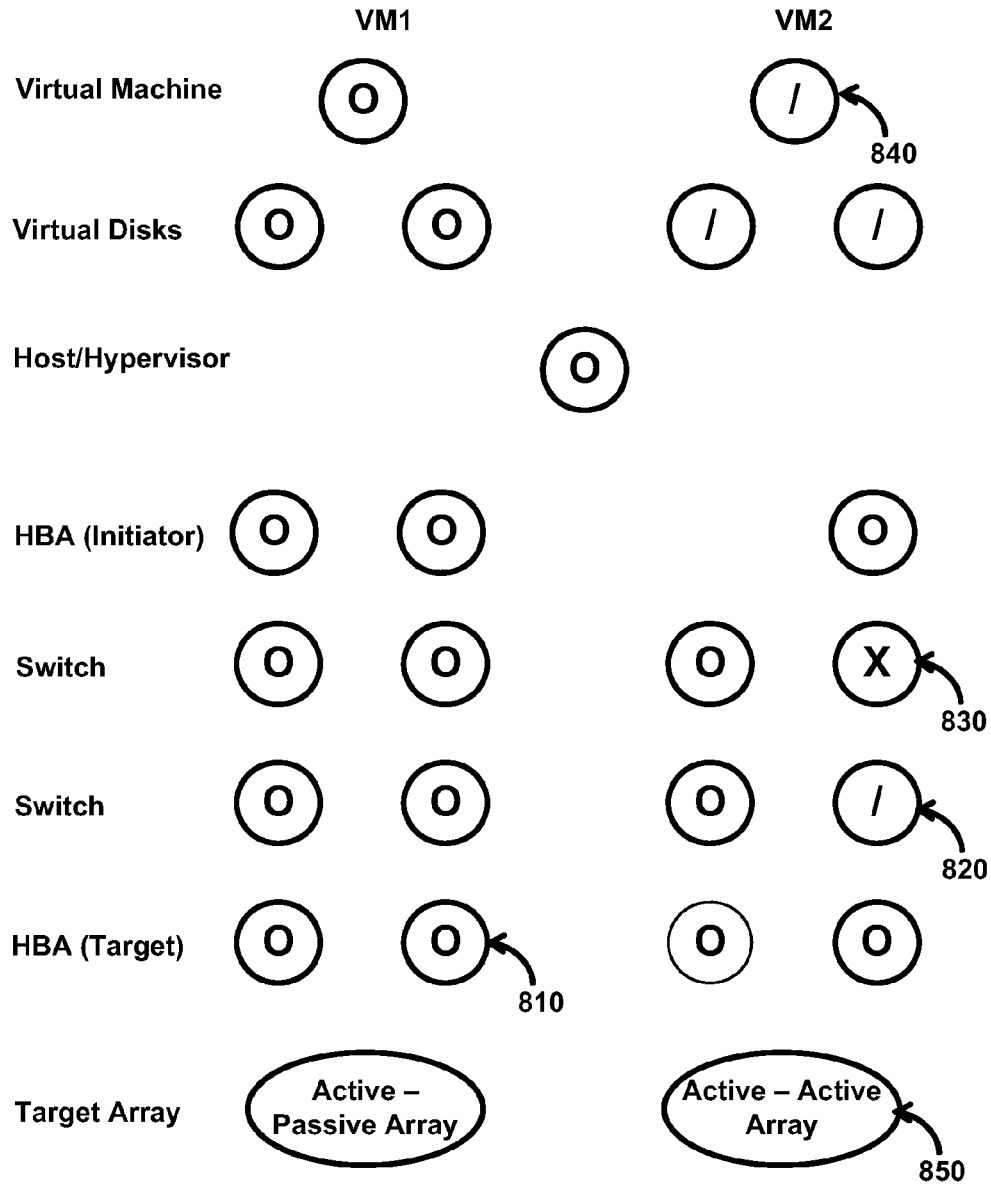
FIG. 8 illustrates an example display of the health of a virtual machine in a graphical user interface, in accordance with an embodiment of the present invention.

FIGS. 7A and 7B show a flow diagram 700 of a method for displaying the health of a virtual machine, according to various embodiments of the present invention. FIG. 8 illustrates an example display 800 of the health of a virtual machine in a graphical user interface, in accordance with an embodiment of the present invention. Flow diagram 700 is described using display 800 for purposes of brevity and clarity. It should be appreciated that display 800 is an example, and that any configuration or arrangement of a display of the health of a virtual machine may be used, as described above.

At procedure 710 of flow diagram 700, an indication of health is displayed for each SAN node of the plurality of SAN nodes. For example, with reference to display 800, a visual indicator of the health of each SAN node is shown. For purposes of clarity, display 800 includes visual indicators: "O" for indicating that the SAN node or virtual machine is healthy, "/" for indicating that the SAN node or virtual machine is degraded, and "X" for indicating that the SAN node or virtual machine is failed. However, it should be appreciated that the visual indicators can be any indicator for conveying health information to a user, including, without limitation: colors, shapes, text, etc.

At procedure 712 of flow diagram 700, it is determined if the expected throughput rate for a particular SAN node is above a first threshold (e.g., 90%). Provided the throughput rate for a particular SAN node is above the first threshold, an indication that the particular SAN node is healthy is displayed at procedure 714. For example, as shown in display 800, visual indicator 810 indicates that the associated HBA (Target) is healthy.

At procedure 716 of flow diagram 700, it is determined if the expected throughput rate for the particular SAN node is not above the first threshold and is above a second threshold (e.g., 50%). Provided the expected throughput rate for the particular SAN node is not above the first threshold and is above the second threshold, an indication that the particular SAN node is degraded is displayed at procedure 718. For example, as shown in display 800, visual indicator 820 indicates that the associated switch is degraded. Alternatively, provided the expected throughput rate for the particular SAN node is not above the second threshold, an indication that the particular SAN node is failed is displayed at procedure 720. For example, as shown in display 800, visual indicator 830 indicates that the associated switch is failed.

At procedure 730 of flow diagram 700, an indication of health for each virtual machine of the plurality of virtual machines is displayed.

At procedure 732 of flow diagram 700, it is determined if a SAN node of a plurality of SAN nodes of a particular virtual machine is indicated as degraded. If a SAN node of a plurality of SAN nodes of a particular virtual machine is indicated as degraded, an indication that the particular virtual machine is degraded is displayed at procedure 734. For example, as shown in display 800, visual indicator 840 indicates that the associated switch is degraded since a SAN node of the virtual machine VM2 is degraded.

At procedure 736 of flow diagram 700, it is determined if a SAN node of a plurality of SAN nodes of a particular virtual machine is indicated as failed and an alternate path through the plurality of SAN nodes for the particular virtual machine is available. If a SAN node of a plurality of SAN nodes of a particular virtual machine is indicated as failed and an alternate path through the plurality of SAN nodes for the particular virtual machine is available, an indication that the particular virtual machine is degraded is displayed at procedure 738. For example, as shown in display 800, visual indicator 840 indicates that the associated switch is degraded since a SAN node of the virtual machine VM2 is failed and an alternate path is available. Alternatively, if a SAN node of a plurality of SAN nodes of a particular virtual machine is indicated as failed and an alternate path through the plurality of SAN nodes for the particular virtual machine is not available, an indication that the particular virtual machine is failed is displayed at procedure 740.

With reference to FIG. 8, example display 800 illustrates the summary of health for a given virtual machine (e.g., VM1 and VM2). As shown, the central management server determines issues with a specific fabric port used by a virtual machine. Where the virtual machine VM2 is sending data to the active-active array 850, the health of the nodes indicated as degraded and failed (e.g., visual indicators 820 and 830) impacts the overall health of the virtual machine. Therefore, the virtual machine VM2 is indicated as in degraded condition.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A computer-implemented method for management of a virtual machine in a storage area network (SAN) environment, the method comprising:

discovering a plurality of SAN devices for the virtual machine by a management server, wherein the discovering a plurality of SAN devices for the virtual machine comprises:
    at a SAN device of the plurality of SAN devices:
        discovering physically adjacent SAN devices connected to the SAN device; and
        registering the physically adjacent SAN devices connected to the SAN device at a name server;
establishing communications between a host device and a target device of the plurality of SAN devices, wherein the virtual machine is resident on the host device;
identifying, at the host device and the target device, a plurality of paths over the plurality of SAN devices to communicate between the host device and the target device; and
populating a mapping table for the virtual machine with the plurality of paths over the plurality of SAN devices to communicate between the host device and the target device;
monitoring performance statistics for the plurality of SAN devices at the management server; and
determining health of the virtual machine based at least in part on the performance statistics for the plurality of SAN devices at the management server.

2. The computer-implemented method of claim 1 wherein the plurality of SAN devices comprises:
    at least one host server for hosting a plurality of virtual machines;
    a plurality of host bus adaptors communicatively coupled to the at least one server;
    a plurality of switches communicatively coupled to the plurality of host bus adaptors; and
    a target memory array communicatively coupled to the plurality of switches.

3. The computer-implemented method of claim 1 wherein the establishing communications between a host device and a target device of the plurality of SAN devices comprises:
    accessing, at a host device of the plurality of SAN devices, the name server to discover a target device of the plurality of SAN device; and
    negotiating, at the host device and the target device, parameters used for further communication between the host device and the target device over the SAN.

4. The computer-implemented method of claim 1 wherein the performance statistics comprise input/output (I/O) statistics from the plurality of SAN devices for data streams of the virtual machine.

5. The computer-implemented method of claim 4 wherein the I/O statistics comprises I/O rate information and I/O error information for each of the plurality of SAN devices.

6. The computer-implemented method of claim 1 wherein the monitoring performance statistics for the plurality of SAN devices comprises:
    querying the plurality of SAN devices for the performance statistics; and
    receiving the performance statistics from the plurality of SAN devices.

7. The computer-implemented method of claim 6 wherein the receiving the performance statistics from the plurality of SAN devices comprises:
    receiving the performance statistics from a host device of the plurality of SAN devices, the receiving the performance statistics from a host device comprising:
        tracking tagged data streams of the virtual machine as the tagged data streams navigate the plurality of SAN devices, wherein a tag identifies a tagged data stream as associated with a particular virtual machine, wherein data streams of the virtual machine are tagged at a host server of the SAN environment; and correlating the tagged data streams to the performance statistics for determining health of a SAN device of the plurality of SAN devices.

8. The computer-implemented method of claim 7 wherein the correlating the tagged data streams to the performance statistics is for identifying I/O rate information and I/O error information of the tagged data streams.

9. The computer-implemented method of claim 7 where the tag is added to the data stream using a SCSI command.

10. The computer-implemented method of claim 6 wherein receiving the performance statistics from the plurality of SAN devices comprises:

receiving the performance statistics from a host bus adaptor of the plurality of SAN devices using a network layer protocol.

11. The computer-implemented method of claim 6 wherein receiving the performance statistics from the plurality of SAN devices comprises:

receiving the performance statistics from a switch device of the plurality of SAN devices using a data link layer protocol.

12. The computer-implemented method of claim 6 wherein receiving the performance statistics from the plurality of SAN devices comprises:

receiving the performance statistics from a target memory array of the plurality of SAN devices using a SCSI protocol.

13. The computer-implemented method of claim 6 wherein the performance statistics are received using an out-of-band scheme.

14. The computer-implemented method of claim 1 wherein the determining the health of the virtual machine based at least in part on the performance statistics for the plurality of SAN devices comprises:

determining an expected I/O rate for the virtual machine through the plurality of SAN devices; and comparing the expected I/O rate to a received I/O rate of the performance statistics.

15. The computer-implemented method of claim 14 further comprising:

determining the health of the virtual machine based on the comparing the expected I/O rate to the received I/O rate of the performance statistics.

16. The computer-implemented method of claim 1 further comprising:

displaying the health of the virtual machine in a graphical user interface.

17. A non-transitory computer readable storage medium having computer-readable program code stored thereon for causing a computer system to perform a method for displaying health of a plurality of virtual machines of a storage area network (SAN), the method comprising:

discovering a plurality of SAN nodes of the SAN for the plurality of virtual machines by a management server;

monitoring performance statistics for the plurality of SAN nodes at the management server, wherein the monitoring performance statistics for the plurality of SAN nodes comprises:

querying the plurality of SAN nodes for the performance statistics; and receiving the performance statistics from the plurality of SAN nodes, wherein the receiving the performance statistics from the plurality of SAN nodes comprises:

receiving the performance statistics from a host device of the plurality of SAN nodes, the receiving the performance statistics from a host device comprising:

tracking tagged data streams of the virtual machine as the tagged data streams navigate the plurality of SAN nodes, wherein a tag identifies a tagged data stream as associated with a particular virtual machine, wherein data streams of the virtual machine are tagged at a host server of the SAN environment; and correlating the tagged data streams to the performance statistics for determining health of a SAN node of the plurality of SAN nodes;

determining health of the plurality of virtual machines of the SAN based at least in part on the performance statistics for the plurality of SAN nodes at the management server; and displaying the health of the plurality of virtual machines in a graphical user interface.

18. The non-transitory computer readable storage medium of claim 17 wherein the determining health of the plurality of virtual machines based at least in part on the performance statistics for the plurality of SAN nodes comprises:

determining an expected throughput rate through the plurality of SAN nodes for each virtual machine of the plurality of virtual machines;

comparing the expected throughput rate to a received throughput rate of the performance statistics for each SAN node of the plurality of SAN nodes; and determining health of each SAN node of the plurality of SAN nodes based on the comparing the expected throughput rate to the received throughput rate of the performance statistics for each SAN node of the plurality of SAN nodes.

19. The non-transitory computer readable storage medium of claim 18, wherein the determining health of the plurality of virtual machines based at least in part on the performance statistics for the plurality of SAN nodes further comprises:

determining the health of each virtual machine of the plurality of virtual machines based on the health of each SAN node of the plurality of SAN nodes.

20. The non-transitory computer readable storage medium of claim 19, wherein the displaying the health of the plurality of virtual machines in a graphical user interface comprises:

displaying an indication of health for each SAN node of the plurality of SAN nodes; and displaying an indication of health for each virtual machine of the plurality of virtual machines.

21. A computer-implemented method for management of a virtual machine in a storage area network (SAN) environment, the method comprising:

discovering a plurality of SAN devices for the virtual machine by a management server;

mapping the plurality of SAN devices to the virtual machine;

monitoring performance statistics for the plurality of SAN devices at the management server, the performance statistics comprising throughput statistics from the plurality of SAN devices for data streams of the virtual machine, the monitoring comprising:

querying the plurality of SAN devices for the performance statistics; and receiving the performance statistics from the plurality of SAN devices using an out-of-band scheme;

determining health of the virtual machine based at least in part on the performance statistics for the plurality of SAN devices at the management server, wherein the health of the virtual machine is based at least in part on health of the plurality of SAN devices for the virtual machine; and displaying the health of the virtual machine in a graphical user interface.

22. The computer-implemented method of claim 21 wherein the determining the health of the virtual machine based at least in part on the performance statistics for the plurality of SAN devices comprises:

determining an expected throughput rate for the virtual machine through the plurality of SAN devices; and comparing the expected throughput rate to a received throughput rate of the performance statistics.

23. The computer-implemented method of claim 22 further comprising:

determining the health of the virtual machine based on the comparing the expected throughput rate to the received throughput rate of the performance statistics.

\* \* \* \* \*